United States Patent
Boran et al.

(10) Patent No.: US 11,836,540 B2
(45) Date of Patent: *Dec. 5, 2023

(54) DYNAMIC PERSONALIZED API ASSEMBLY

(71) Applicant: Salesforce, Inc., San Francisco, CA (US)

(72) Inventors: Christopher David Boran, Burlington, MA (US); Victor Manuel Romero Carrasco, Malaga (ES)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,745

(22) Filed: Dec. 29, 2022

(65) Prior Publication Data

US 2023/0138693 A1 May 4, 2023

Related U.S. Application Data

(63) Continuation of application No. 17/158,163, filed on Jan. 26, 2021, now Pat. No. 11,556,399.

(51) Int. Cl.
*G06F 9/54* (2006.01)
*G06F 16/953* (2019.01)
*H04L 67/10* (2022.01)

(52) U.S. Cl.
CPC ............ *G06F 9/541* (2013.01); *G06F 16/953* (2019.01); *H04L 67/10* (2013.01); *G06F 2209/541* (2013.01)

(58) Field of Classification Search
None
See application file for complete search history.

(56) References Cited

U.S. PATENT DOCUMENTS

| | | | |
|---|---|---|---|
| 11,556,399 B2 * | 1/2023 | Boran | G06F 16/953 |
| 2007/0180099 A1 | 8/2007 | Tsimelzon | |
| 2013/0097320 A1 | 4/2013 | Ritter | |
| 2014/0351860 A1 | 11/2014 | Chen | |
| 2016/0173637 A1 * | 6/2016 | Mastrangelo | G06F 11/3419 709/217 |
| 2019/0317776 A1 * | 10/2019 | Walsh | H04L 41/0803 |

* cited by examiner

*Primary Examiner* — Umut Onat
(74) *Attorney, Agent, or Firm* — Butzel Long

(57) ABSTRACT

Methods, computer readable media, and devices for dynamic personalized API assembly are provided. One method may include receiving a data query from a client by a CDN, parsing the data query to generate a modified data query, transmitting the modified data query to an origin server, receiving a query response from the origin server, the query response including content corresponding to the plurality of data elements and an indication specifying whether the content is cacheable in the CDN, and sending a modified query response including responsive content comprising one or more of content previously cached on the CDN and the content obtained from the origin server. Another method may include receiving an API call by an origin server, generating an API response by creating a payload file and adding indication specifying whether the content is cacheable in the CDN, and transmitting the API response.

12 Claims, 7 Drawing Sheets

Request #1

| Actor | Action | |
|---|---|---|
| User Request | GET /api/product/1234?userid=1&attributes=price,description,unitquantity,promotions | 142 |
| Edge Worker | Cache Miss, forward request to origin server with all params | 144 |
| Origin Server | Call backend services and assemble request | 146 |
| Edge Worker | Decode response body<br>{<br>  '@id:sku': 1234,<br>  '@cache[1h]:descirption': 'rubber balls',<br>  '@cache[24h]:unitquantity': '12',<br>  '@nocache:price': '12.99 USD',<br>  '@nocache:promotions': [ { 'promoid': 4566, 'description': 'buy one get one free' } ]<br>} | 148 |
| Edge Worker | Save parsed metadata (cache description 1h, cache unitquantity for 24h, do not cache price or promos, use SKU as an identity), save description in the cache for 1h and unitquantity for 24h | 150 |
| Edge Worker | Return Payload to caller stripped of markup:<br>{<br>  'sku': 1234,<br>  'descirption': 'rubber balls',<br>  'unitquantity': 12,<br>  'price': '12.99 USD',<br>  'promotions': [ { 'promoid': 4566, 'description': 'buy one get one free' } ]<br>} | 152 |

Request #2

| Actor | Action |
|---|---|
| User Request | GET /api/product/1234?userid=1&attributes=price,description,color — 162 |
| Edge Worker | Cache Hit, retrieve metadata, build query asking for price (non cachable) and color (not present in cache) from the origin server — 164 |
| Origin Server | Call backend services and assemble request — 166 |
| Edge Worker | Decode response body<br>{<br>   '@id:sku': 1234,<br>   '@cache[24h]:color': 'red',<br>   '@nocache:price': '11.99 USD',<br>} — 168 |
| Edge Worker | Prase response. Add color with a 24h cache setting to the metadata, add color to the cached object. — 170 |
| Edge Worker | Return Payload to caller stripped of markup, omitting unitquantity which is cached but not requested, and adding color which is now cached and was requested<br>{<br>   'sku': 1234,<br>   'descirption': 'rubber ball',<br>   'color': 'red',<br>   'price': '11.99 USD'<br>} — 172 |

US 11,836,540 B2

DYNAMIC PERSONALIZED API ASSEMBLY

CROSS-REFERENCE TO RELATED APPLICATIONS

This application is a continuation of, and claims priority to, U.S. patent application Ser. No. 17/158,163, filed Jan. 26, 2021, now U.S. Pat. No. 11,556,399, issued Jan. 17, 2023, the contents of which are incorporated herein by reference in their entirety and should be considered part of this specification.

TECHNICAL FIELD

One or more implementations relate to the field of application programming interfaces (APIs); and more specifically, to dynamic personalized API assembly.

BACKGROUND

An API typically utilizes a response payload file to provide content to a client in response to a data request. A common approach to creating the response payload file includes an origin server, such as a GRAPHQL® server, that retrieves content from various services and aggregates the content into the response payload file. However, content aggregated in this fashion is often unable to be cached by a content distribution network (CDN).

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 1B-1C illustrate sample requests according to some example implementations.

DETAILED DESCRIPTION

Figure 1A:
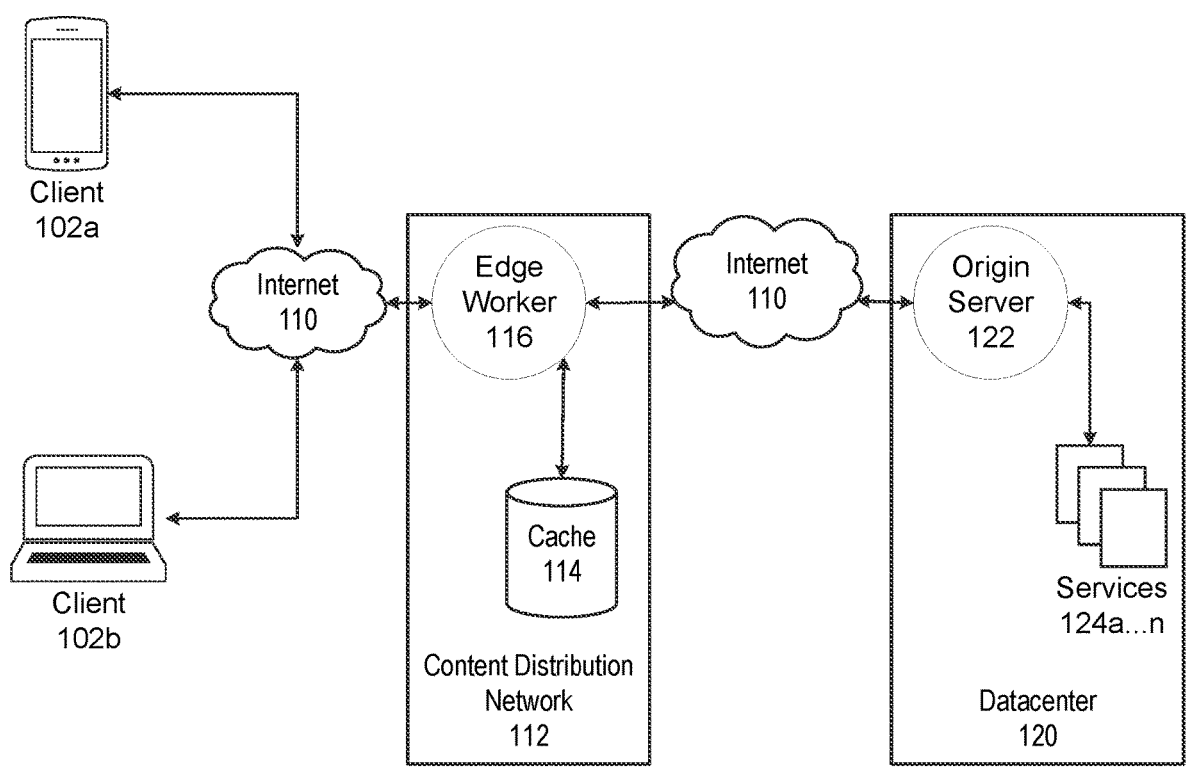
FIG. 1A is a block diagram illustrating a system utilizing dynamic personalized application programming interface (API) assembly according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

A content distribution network (CDN) improves network access to content by storing portions of the content in caches that are logically closer to end users. This "logically closer to end users" location is often referred to as the edge of the network. The content most likely to be cached is static content or content that is otherwise less likely to change over time. Traditionally, a CDN would reference a cache-control header included in a page and cache content based on the cache-control header.

Over time, there has been a rise in Single Page Applications (SPAs) which are applications built to run on a client and asynchronously call application programming interfaces (APIs) to fetch data from servers. Generally, these SPAs are representational state transfer (REST) API driven—the uniform resource locator (URL) has meaning because the URL contains the body of the request and the content is returned as a JAVASCRIPT® object notation (JSON) payload. Since CDNs use URLs to make caching decisions, one of the shortcomings is that API calls where the body of the request changes the meaning of the URL (e.g., PUT, POST) are uncacheable while GET URLs are typically still able to be controlled via cache-control headers. Since read traffic (e.g., GET URLs) tends to dominate, this approach is still beneficial for simple APIs, but overall performance is decreased and traffic at the origin servers is increased.

More recently, GRAPHQL® has started to become dominant—largely driven by low bandwidth needs of mobile devices to call the same APIs but retrieve smaller summaries. GRAPHQL® uses a concept of client-control of the APIs instead of server control—if a system uses GRAPHQL®, a client can request specific attributes on a returned object without the need to request or process a superset of the content. GRAPHQL® can also function as an aggregator of sorts by bundling many API calls into a single response. For example, a GRAPHQL® server can receive a single request from a client that represents multiple API calls, send each individual API call to the appropriate backend service, receive the individual API responses, and bundle all of the responses into a single response payload file. However, the use of GRAPHQL® is controlled via body parameters as opposed to headers. As a result, increased use of GRAPHQL® has led to less and less content being cacheable and processing by backend services is increased.

Currently, there is an increased preference for personalized content via personalized APIs. For example, two users may be shopping at the same web storefront and viewing the same product (e.g., a sweater). However, based on a number of criteria, the web storefront may wish to offer different pricing, discounts, bundles, or the like to user A that are different than those offered to user B. As such, a portion of the content is dynamic and specific to each user. Thus, even if the content could be cached, the content should not be cached because the content is specific to each user.

In one example, an online clothing store may want to set a price based on shopper loyalty. When a shopper logs in, either via an app on a mobile device or via a website, the online clothing store may want to present the shopper with a standard product listing page, but with a special price depending on the shopper's order history—lowering the price for frequent shoppers based on length and volume of activity.

In this example, most of the data on the page is static—only the price differs. To improve performance and optimize for limited mobile device bandwidth, a client application or app may use a GRAPHQL® API. However, as previously disclosed, the use of a GRAPHQL® API means that none of the content will be cached by a CDN that is directly providing the pages to the user even though most of the content is static, leading to unnecessary data transfer and associated bandwidth usage and delay.

Various implementations of the disclosed subject matter may provide an improvement on this arrangement by creating a markup language that provides an indication of whether content may be cacheable. In various implementations, a backend service may include the markup language in a response to an API call. For example, a GRAPHQL® or other source may submit an API call to the backend service and, as part of the API response, the backend service may indicate that portions of the content are cacheable and other portions are not cacheable using the markup language.

In various implementations, a compute process executing within a CDN, such as an edge worker, may receive an API response that includes the markup language. The compute process may parse the API response and, based on the markup language, cache portions of the content. The compute process may then create a modified API response by removing the markup language from the API response and including any previously cached content. The compute process would then forward the API response to a client.

In these implementations, the compute process may have previously received an API call that triggered the API response. When the compute process initially received the API call, the compute process may have parsed the API call to determine whether portions of the content were already cached. For those portions of content not already cached, the compute process may generate a modified API call and send the modified API call to an origin server. Thus, the modified API call may represent a request for only some portions of the content requested in the API call. Similarly, the API response received by the compute process from the origin server may represent only those portions of content requested in the modified API call while the modified API response sent to the client will include all of the content requested by the API call.

Implementations of the disclosed subject matter provide methods, computer readable media, and devices for dynamic personalized API assembly. Implementations of the disclosed subject matter may include receiving a data query including a plurality of data elements from a client by a CDN. The CDN may parse the data query to generate a modified data query including only a subset of data elements corresponding to content not previously cached by the CDN. The CDN may transmit the modified data query to an origin server and receive a query response from the origin server. The query response may include, for each data element included in the modified data query, the data element, content corresponding to the data element, and a markup directive indicating cacheability of the corresponding content. The CDN may generate a modified query response, including both content previously cached and content received from the origin server, based on the query response and send the modified query response to the client.

In various implementations, parsing the data query may include, for the data elements, determining whether content corresponding to the data element was previously cached and including the data element in the modified data query in response to determining the content corresponding to the data element was not previously cached.

In various implementations, generating a modified query response based on the query response may include, for the data elements, including the data element and content corresponding to the data element based on whether the data element is one of the one or more data elements included in the modified data query.

In some implementations, including the data element and content corresponding to the data element based on whether the data element is one of the one or more data elements included in the modified data query includes, in response to determining the data element is not one of the one or more data elements included in the modified data query, retrieving content corresponding to the data element from a cache of the CDN and including the data element and the retrieved content in the modified query response.

In some implementations, including the data element and content corresponding to the data element based on whether the data element is one of the one or more data elements included in the modified data query includes, in response to determining the data element is one of the one or more data elements included in the modified data query, parsing the markup directive and including the data element and the content corresponding to the data element in the modified query response. In some implementations, parsing the markup directive includes, in response to determining the markup directive indicates content corresponding to the data element is cacheable, caching content corresponding to the data element.

Implementations of the disclosed subject matter may include receiving, by an origin server, an API call requesting content corresponding to a data element for display by a client, generating an API response based on the API call by creating an API response payload file including a name::value pair, the name being the data element and the value being the content corresponding to the data element, and adding a markup directive for the name::value pair indicating whether the content corresponding to the data element is cacheable, and transmitting the API response by the origin server.

In various implementations, the API call may request content corresponding to a plurality of data elements and generating the API response based on the API call may include including a plurality of name::value pairs in the API response payload file and adding, for the plurality of name::value pairs, a markup directive indicating whether the content in the value is cacheable.

In various implementations, the API response payload file may be a JAVASCRIPT® object notation (JSON) payload.

In various implementations, the API call may be based on a modified data query generated by a content distribution network (CDN).

FIG. 1A illustrates a system 100 utilizing dynamic personalized application programming interface (API) assembly according to some example implementations. In various implementations, users may interact with origin server 122 and services 124*a* . . . *n* via the Internet 110 using clients 102*a*, 102*b*. Clients 102*a*, 102*b* may be, for example, a laptop, a computer, a mobile device, a tablet, and/or some other computing device. In various implementations, origin server 122 and services 124*a* . . . *n* may, for example, be located within datacenter 120. Although origin server 122 and datacenter 120 are shown as single elements, this is only for simplicity. In some implementations, origin server 122 may be, for example, a plurality of servers deployed in a distributed fashion and the plurality of servers may be located in a single datacenter and/or distributed across a plurality of datacenters. Similarly, services 124a . . . n may be located in the same datacenter as origin server 122, may be located in a different datacenter, and/or may be distributed across a plurality of datacenters. In some implementations, origin server 122 and services 124a . . . n may implement a single application and/or online environment, such as retail shopping, information retrieval, and/or relationship management. In some implementations, origin server 122 and services 124a . . . n may implement a plurality of applications and/or online environments. That is, origin server 122 and services 124a . . . n may be dedicated to a single solution or may be shared by multiple solutions.

In various implementations, content distribution network (CDN) 112 may be utilized, for example, to cache content provided by origin server 122 and services 124a . . . n. By caching certain content, CDN 112 may reduce the load on origin server 122 and services 124a . . . n as well as improve performance for clients 102a, 102b. Although shown as a single element, this is only for simplicity and a plurality of CDNs may be located in a distributed fashion. In various implementations, CDN 112 may utilized cache 114 in which to store various content. Cache 114 may be, for example, a data store or other storage, such as a hard drive array, disk array, storage array, or the like. In various implementations, CDN 112 may also include edge worker 116. Edge worker 116 may be, for example, a compute process or compute resource configured to perform one or more computer functions or otherwise execute computer instructions. For example, edge worker 116 may be software executing on a computer server and/or a distributed cluster of computer servers. The edge worker 116 in a CDN may be integrated with other servers, clusters, or similar hardware of the CDN, or may be implemented on separate devices that are dedicated to edge interfaces.

In various implementations, a user may interact with a client, such as clients 102a, 102b, to access an application, such as retail shopping, implemented by origin server 122 and services 124a . . . n. The user may submit a request, such as a request for details of a specific product. The request may first be received by edge worker 116 and edge worker 116 may parse the request to determine whether portions of the request may be served by content already cached in cache 114. For those portions not already cached, edge worker 116 may forward a modified request to origin server 122. The modified request may include, for example, a request for content not previously cached by CDN 112. Origin server 122 may receive the modified request and, in turn, submit requests to services 124a . . . n in order to obtain the requested content. Services 124a . . . n may provide the requested content to origin server 122. In some implementations, services 124a . . . n may markup the requested content and/or otherwise indicate whether portions of the requested content may be cached by CDN 112. Origin server 122 may receive the requested content from services 124a . . . n and send the requested content to edge worker 116. Edge worker 116 may parse the requested content received from origin server 122 and, based on the markup, cache those portions that are cacheable in cache 114. Edge worker 116 may then combine the previously cached content and the requested content from origin server 122 and provide the combined content to the client. In this way, CDN 112 may be utilized to provide previously cached content, cache cacheable content, and request content not previously cached or otherwise not cacheable from origin server 122 and services 124a . . . n.

FIG. 1B illustrates a sample request 140 received as part of dynamic personalized API assembly according to some example implementations. For example, a user request (142) may include a GET request for a uniform resource locator (URL) for a particular product that includes a price, a description, a unit quantity, and any available promotions. An edge worker within a CDN may review the request (144) and determine that none of the requested content was previously cached. As such, the edge worker may forward the entire request to an origin server. The origin server may request or other retrieve requested content from one or more backend services and assemble the requested content into a response that is sent back to the edge worker (146). The edge worker may parse or otherwise decode the response (148) and determine that various elements include markup indicating whether portions of content may be cached. For example, as shown in FIG. 1B, the description and the unit quantity may be cached while the price and any promotions may not be cached. The edge worker may then cache (150) the cacheable content (e.g., description and quantity) and provide the requested content to the client without any markup (152).

FIG. 1C illustrates a sample request 160 received as part of dynamic personalized API assembly according to some example implementations. Sample request 160 may be received, for example, after sample request 140 was received and processed. In addition, sample request 160 may be received from the same user that submitted sample request 140 or from some other user. In sample request 160, the user request (162) may include a request for a price, a description, and a color. As shown in FIG. 1C, content providing the description of the product was previously cached (as shown in FIG. 1B). As such, the edge worker may generate a modified request (164) for only the price and the color from the origin server. The origin server may generate a reply that includes the price and the color (166). In addition, the reply may also include markup for the elements indicating whether the content is cacheable. As can be seen, the color is cacheable while the price is not cacheable. The edge worker may receive the reply and parse the reply (168). Based on the markup, edge worker may cache the color (170). The edge worker may then generate a reply to the client (172) that includes both the previously cached content (i.e., the description) and the content received from the origin server (i.e., the color and the price).

Figure 2A:
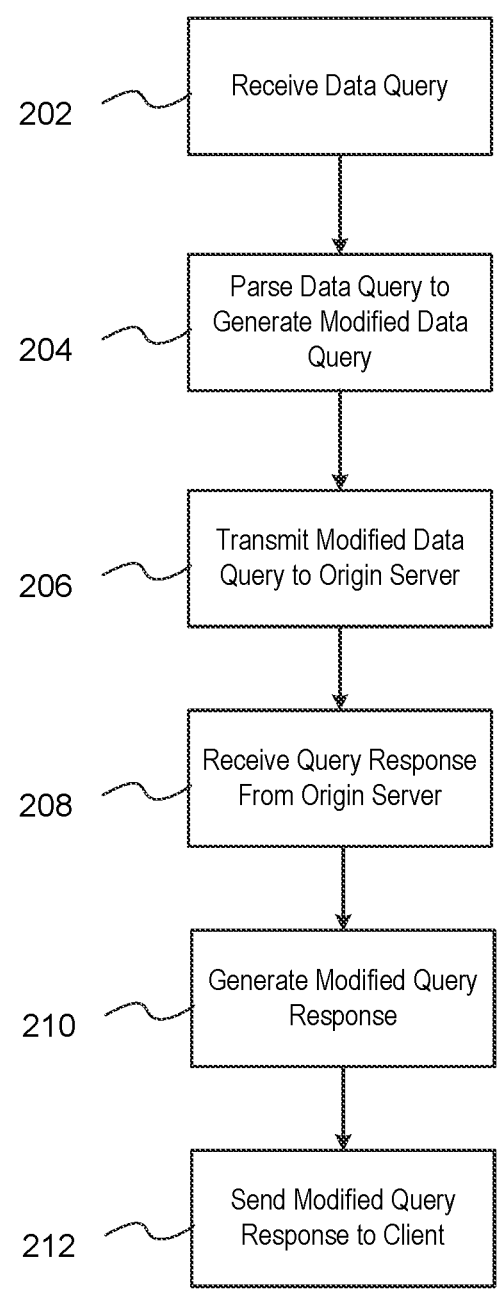
FIG. 2A is a flow diagram illustrating a method for use with dynamic personalized API assembly according to some example implementations.

More generally, FIG. 2A illustrates a method 200 for use in dynamic personalized API assembly, as disclosed herein. The method 200 may be performed, for example, by a CDN, such as CDN 112 of FIG. 1A. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a data query may be received. For example, a compute process within a CDN may receive a data query from a client. The data query may include, for example, a request for content as part of an application and/or app executing on the client. The data query may be, for example, an API call. In one example, the application and/or app implements a retail shopping experience. In this example, the data query may be a request for additional information corresponding to a particular product.

In step 204, the data query may be parsed to generate a modified data query. For example, the CDN may determine whether portions of the content were previously cached by the CDN. In various implementations, the modified data query may include a request for only those portions of content not previously cached by the CDN. In the retail shopping example, the CDN may have previously cached content corresponding to a description of the product. However, content corresponding to a price of the product may not have been previously cached. As such, while the data query may include a request for both the description and the price, the modified data query may only include a request for the price.

In step 206, the modified data query may be transmitted to an origin server and, in step 208, a query response may be received from the origin server. In various implementations, transmission and reception may be via a public network, such as the Internet, via a private network, and/or via some combination of public and private networks. The query response may include, for example, a JAVASCRIPT® object notation (JSON) payload. In various implementations, the JSON payload may include, for example, one or more name::value pairs where the name field indicates a name of an object and the value field includes content corresponding to the object. For example, in the retail shopping experience, one name::value pair may represent the description and another name::value pair may represent the price. In this example, one pair may be description::rubber ball and another pair may be price::11.99.

In step 210, a modified query response may be generated. For example, the CDN may generate a modified query response by including content previously cached as well as content received as part of the query response from the origin server. Returning to the retail shopping example, the CDN may include the previously cached description as well as the newly received price in the modified query response. The modified query response may be, for example, a JSON payload.

In various implementations, the received query response may also include markup for each of the portions of content. For example, each name::value pair may also include corresponding markup. The markup may indicate whether portions of content are cacheable. The markup may include, for example, directives such as @cache for cacheable elements, @nocache for non cacheable elements, and/or @id for identifier elements. In these implementations, as part of generating the modified query response, the CDN may parse the markup, perform certain actions based on the markup, and remove the markup. For example, the CDN may cache those portions that are cacheable. Again in the retail shopping example, the data query may have also included a request for a color, which was not previously cached by the CDN. In this example, the query response may include content corresponding to the color and content corresponding to the price. In addition, the query response may include markup indicating that the color is cacheable content while the price is not cacheable content. As such, the CDN may generate the modified query response by caching the content corresponding to the color and including the color, the price, and the previously cached description in the modified query response.

In step 212, the modified query response may be sent to the client. For example, the CDN may provide the description and the price to the retail shopping experience application and/or app.

Figure 2B:
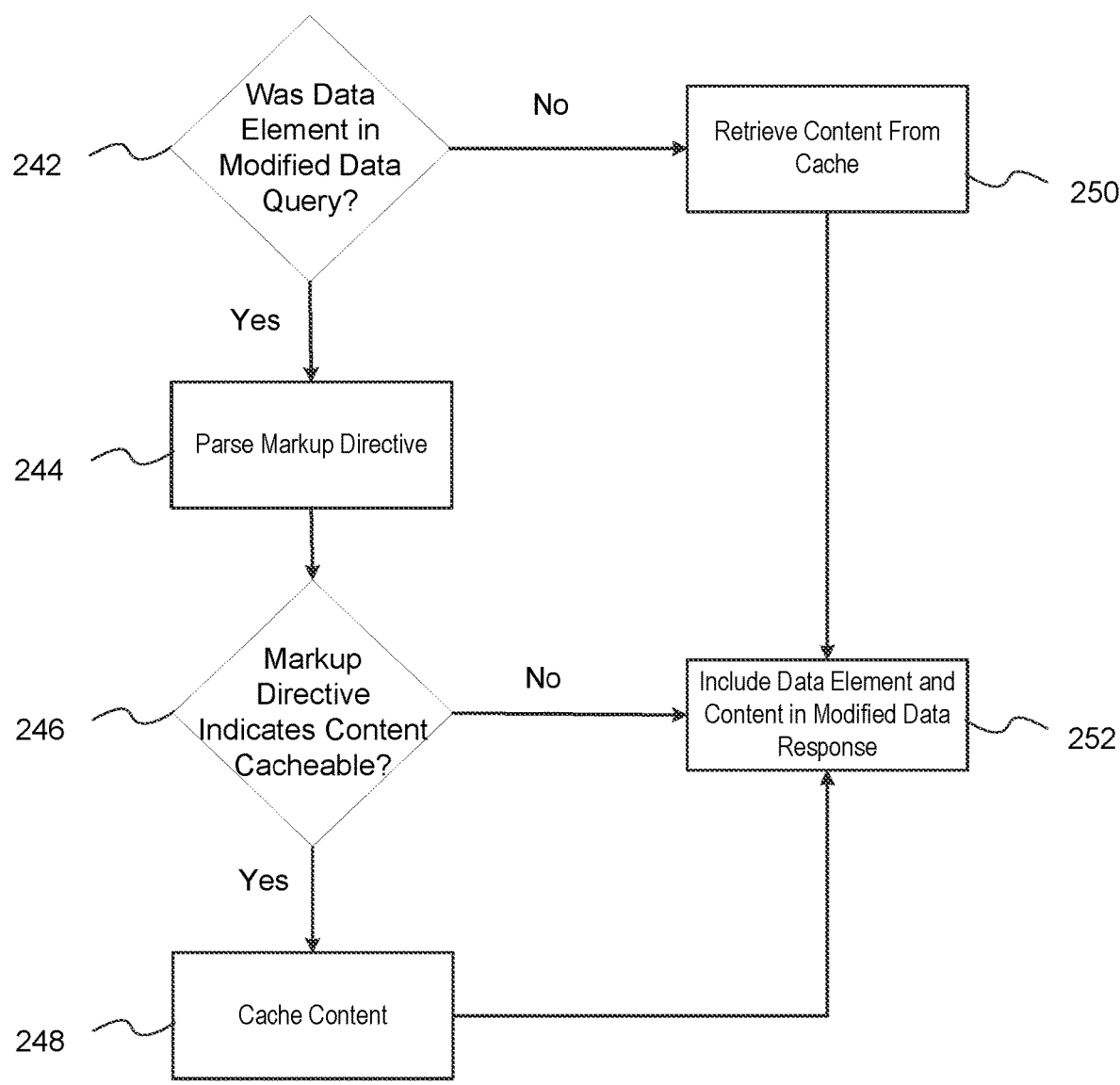
FIG. 2B is a flow diagram illustrating a method for use with dynamic personalized API assembly according to some example implementations.

FIG. 2B illustrates a method 240 for use with dynamic personalized API assembly, as disclosed herein. The method 240 may be performed by a CDN, such as CDN 112 of FIG. TA. In various implementations, the steps of method 240 may be performed by a server, such as electronic device 300 of FIG. 3A or system 340 of FIG. 3B, and/or by software executing on a server or distributed computing platform. Although the steps of method 240 are presented in a particular order, this is only for simplicity. In various implementations, method 240 may be performed as part of generating a modified query response, such as in step 210 of method 200 in FIG. 2A.

In determination step 242, a CDN may determine whether a data element was included in a modified data query. As discussed above in relation to method 200 of FIG. 2B, a CDN may receive a data query from a client and generate a modified data query based on whether content requested in the data query was previously cached or not. As such, the CDN, in determination step 242, may determine whether content corresponding to each data element was previously cached.

If the data element was not included in the modified data query (i.e., determination step 242 is "No"), the CDN may retrieve content corresponding to the data element from cache in step 250. For example, the CDN may retrieve previously cached content from cache, such as cache 114 in FIG. TA.

In step 252, the CDN may include the data element and corresponding content in a modified data response. For example, the CDN may add a name::value pair into a JSON payload where the name field is the name of the data element and the value field is the content corresponding to the data element.

If the data element was included in the modified data query (i.e., determination step 242 is "Yes"), the CDN may parse any markup directive corresponding to the data element in step 244. For example, the data element may be included in the modified data query because content corresponding to the data element was not previously cached. As such, data elements included in the modified data query represent content requested from an origin server. In turn, data elements received from the origin server may include markup indicating whether content is cacheable. Thus, in step 244, the CDN may parse markup included with the data element by the origin server.

In determination step 246, the CDN may determine whether the markup directive indicates that content is cacheable. In various implementations, markup directives may include an indication that content is cacheable, an indication that is not cacheable, an indication that content is an identifier, and/or the like. For example, a markup directive @cache may indicate that content is cacheable, a markup directive @nocache may indicate that content is not cacheable, and a markup directive @id may indicate the content is an identifier. In some implementations, a markup directive may also include a time and/or some other indication of how long cacheable content is to be maintained in cache. For example, a markup directive @cache[1h] may indicate that the content is to be maintained in cache for 1 hour and a markup directive @cache[24h] may indicate that the content is to be maintained in cache for 24 hours.

If the markup directive indicates that content is not cacheable (i.e., determination step 246="No"), the data element and corresponding content may be included in the modified data response in step 252.

If the markup directive indicates that content is cacheable (i.e., determination step 246="Yes"), the CDN may proceed to cache content corresponding to the data element in step 248. For example, if content corresponding to the data element is cacheable, the CDN may then cache that content. The CDN may then include the data element and corresponding content in the modified data response in step 252.

Figure 2C:
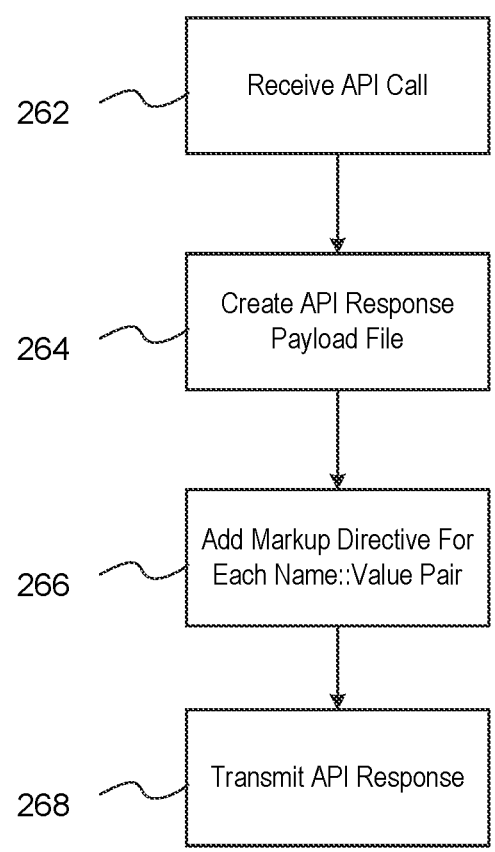
FIG. 2C is a flow diagram illustrating a method for use with dynamic personalized API assembly according to some example implementations.

FIG. 2C illustrates a method 260 for use with dynamic personalized API assembly, as disclosed herein. The method 260 may be performed, for example, by an origin server, such as origin server 122 of FIG. 1A, and/or backend services, such as services 124a . . . n of FIG. 1A. In various implementations, the steps of method 260 may be performed by a server, such as electronic device 300 of FIG. 3A or system 340 of FIG. 3B. Although the steps of method 260 are presented in a particular order, this is only for simplicity.

In step 262, an API call may be received. For example, an origin server or service may receive a request for content, such as the modified data query described with respect to step 206 in FIG. 2A.

In step 264, an API response payload file may be created by the origin server or service. In various implementations, the API response payload may be a JSON payload. In some implementations, the JSON payload may include a name::value pair for each data element and corresponding content being requested.

In step 266, a markup directive may be added for each name::value pair within the API response payload. The markup directive may, for example, indicate whether content corresponding to the data element is cacheable. The markup directive may include, for example, @cache if content is cacheable, @nocache if content is not cacheable, @id if content is an identifier, and/or the like.

In step 268, an API response that includes the API response payload, such as the query response described with respect to step 208 in FIG. 2A, may be transmitted. For example, the origin server or service may transmit the API response payload with the API response in response to the API call received in step 262.

As can be seen, the method 260 of FIG. 2C may represent a method of marking up content by an origin server or service while the method 200 of FIG. 2A and the method 240 of FIG. 2B may represent methods of processing the marked up content and taking actions based on the markup. In conjunction, methods 200, 240, and 260 may provide an approach for a CDN to provide cache services even if content is highly personalized, such as when a GRAPHQL® server is implemented.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
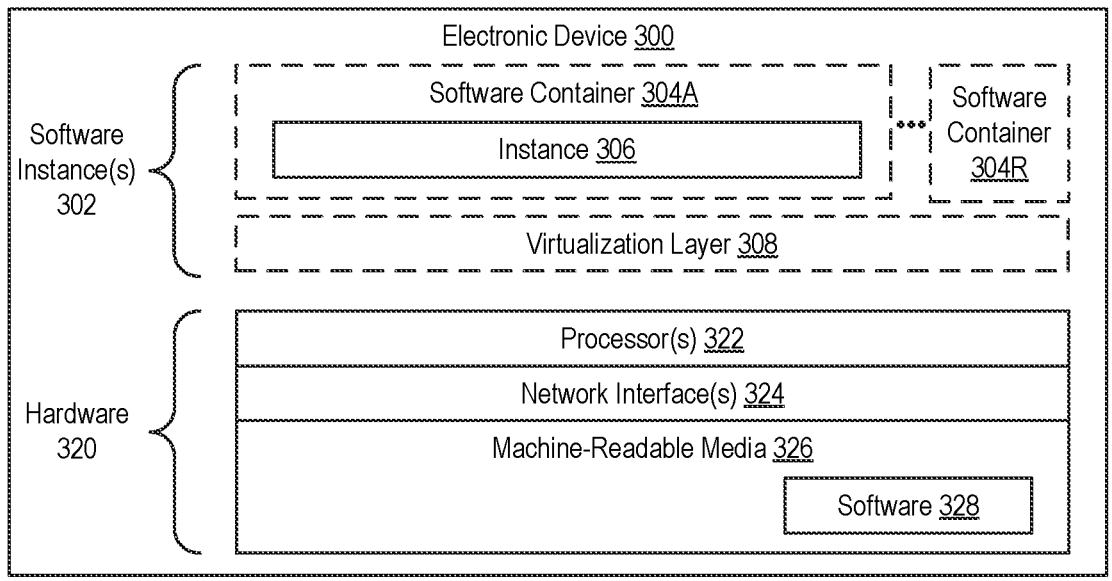
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and dynamic personalized API assembly may be implemented in one or more electronic devices 300. In one implementation: 1) each of the clients is implemented in a separate one of the electronic devices 300 (e.g., in end user devices where the software 328 represents the software to implement clients to interface directly and/or indirectly with dynamic personalized API assembly (e.g., software 328 represents a web browser, a native client, a portal, a command-line interface, and/or an application programming interface (API) based upon protocols such as Simple Object Access Protocol (SOAP), Representational State Transfer (REST), etc.)); 2) dynamic personalized API assembly is implemented in a separate set of one or more of the electronic devices 300 (e.g., a set of one or more server devices where the software 328 represents the software to implement the framework for modeling heterogeneous feature sets); and 3) in operation, the electronic devices implementing the clients and dynamic personalized API assembly would be communicatively coupled (e.g., by a network) and would establish between them (or through one or more other layers and/or other services) connections for submitting requests to dynamic personalized API assembly and returning responses to the clients. Other configurations of electronic devices may be used in other implementations (e.g., an implementation in which the client and dynamic personalized API assembly are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as DOCKER® Engine by Docker, Inc. or rkt in Container LINUX® by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
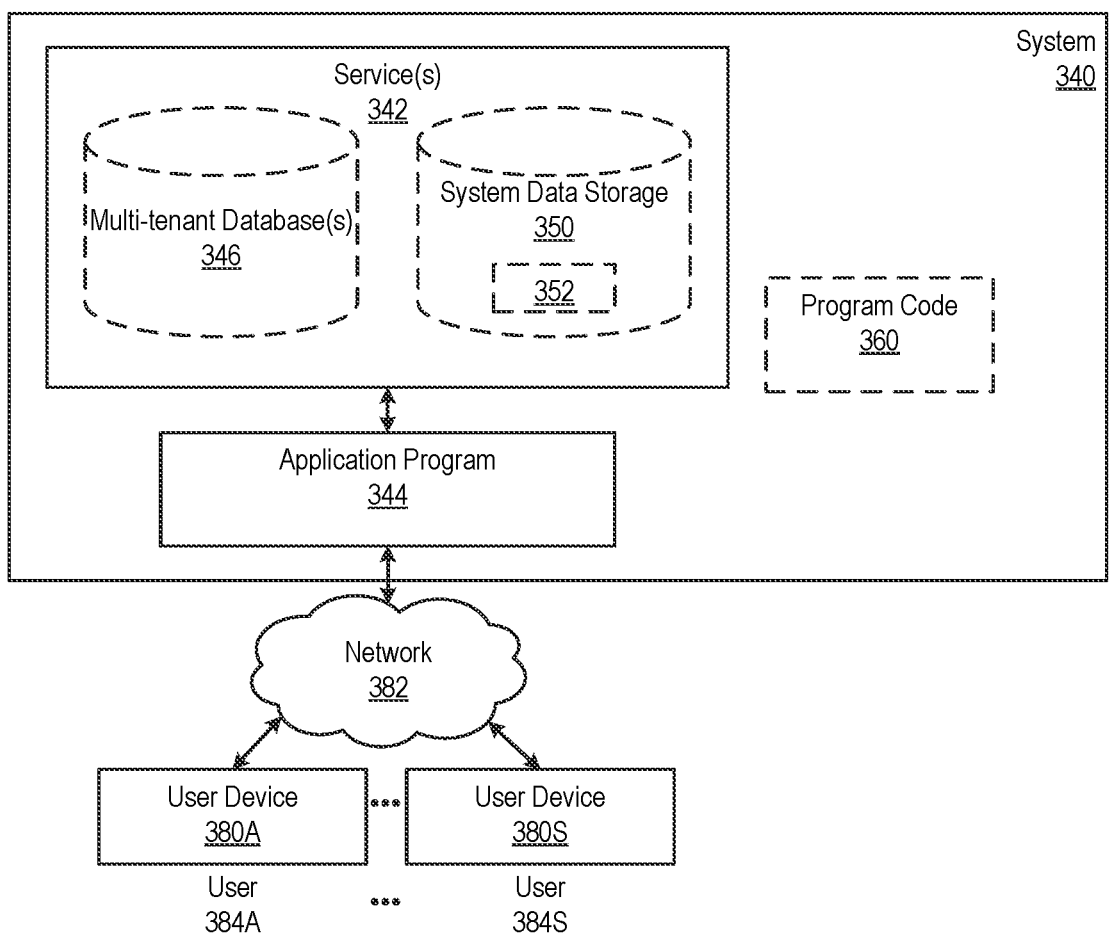
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including dynamic personalized API assembly. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Predictive Product Availability for Grocery Delivery; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method comprising:
   receiving, by a content distribution network (CDN), a data query from a client, the data query including a plurality of data elements;
   parsing, by the CDN, the data query to generate a modified data query, the modified data query including one or more of the plurality of data elements for which corresponding content was not previously cached;
   transmitting, by the CDN, the modified data query to an origin server;
   receiving, by the CDN, a query response from the origin server, the query response including content corresponding to the plurality of data elements and an indication specifying whether the content is cacheable in the CDN; and
   sending, by the CDN, a modified query response including responsive content comprising one or more of content previously cached on the CDN and the content obtained from the origin server.

2. The computer-implemented method of claim 1, wherein parsing the data query to generate the modified data query comprises:
   for the plurality of data elements:
      determining whether the content corresponding to the plurality of data elements was previously cached; and
      including the one or more of the plurality of data elements included in the modified data query in response to determining the content corresponding to the one or more of the plurality of data elements was not previously cached.

3. The computer-implemented method of claim 1, wherein sending the modified query response comprises:
   for the plurality of data elements:
      including a data element and content corresponding to the data element based on whether the data element is one of the one or more of the plurality of data elements included in the modified data query.

4. The computer-implemented method of claim 3, wherein including the data element and content corresponding to the data element based on whether the data element is one of the one or more of the plurality of data elements included in the modified data query comprises:
    in response to determining the data element is not one of the one or more of the plurality of data elements included in the modified data query:
        retrieving content corresponding to the data element from a cache of the CDN; and
        including the data element and the retrieved content in the modified query response.

5. The computer-implemented method of claim 3, wherein including the data element and content corresponding to the data element based on whether the data element is one of the one or more of the plurality of data elements included in the modified data query comprises:
    in response to determining the data element is one of the one or more of the plurality of data elements included in the modified data query:
        parsing the indication specifying whether the content is cacheable in the CDN; and
        including the data element and the content corresponding to the data element in the modified query response.

6. The computer-implemented method of claim 5, wherein parsing the indication specifying whether the content is cacheable in the CDN comprises:
    in response to determining the indication specifying whether the content is cacheable in the CDN indicates the content corresponding to the data element of the one or more of the plurality of data elements included in the modified data query is cacheable, caching the content corresponding to the data element.

7. A non-transitory machine-readable storage medium that provides instructions that, if executed by a processor, are configured to cause said processor to perform operations comprising:
    receiving, by a content distribution network (CDN), a data query from a client, the data query including a plurality of data elements;
    parsing, by the CDN, the data query to generate a modified data query, the modified data query including one or more of the plurality of data elements for which corresponding content was not previously cached;
    transmitting, by the CDN, the modified data query to an origin server;
    receiving, by the CDN, a query response from the origin server, the query response including content corresponding to the plurality of data elements and an indication specifying whether the content is cacheable in the CDN; and
    sending, by the CDN, a modified query response including responsive content comprising one or more of content previously cached on the CDN and the content obtained from the origin server.

8. The non-transitory machine-readable storage medium of claim 7, wherein parsing the data query to generate the modified data query comprises:
    for the plurality of data elements:
        determining whether the content corresponding to the plurality of data elements was previously cached; and
        including the one or more of the plurality of data elements included in the modified data query in response to determining the content corresponding to the one or more of the plurality of data elements was not previously cached.

9. The non-transitory machine-readable storage medium of claim 7, wherein sending the modified query response comprises:
    for the plurality of data elements:
        including a data element and content corresponding to the data element based on whether the data element is one of the one or more of the plurality of data elements included in the modified data query.

10. The non-transitory machine-readable storage medium of claim 9, wherein including the data element and content corresponding to the data element based on whether the data element is one of the one or more of the plurality of data elements included in the modified data query comprises:
    in response to determining the data element is not one of the one or more of the plurality of data elements included in the modified data query:
        retrieving content corresponding to the data element from a cache of the CDN; and
        including the data element and the retrieved content in the modified query response.

11. The non-transitory machine-readable storage medium of claim 9, wherein including the data element and content corresponding to the data element based on whether the data element is one of the one or more of the plurality of data elements included in the modified data query comprises:
    in response to determining the data element is one of the one or more of the plurality of data elements included in the modified data query:
        parsing the indication specifying whether the content is cacheable in the CDN; and
        including the data element and the content corresponding to the data element in the modified query response.

12. The non-transitory machine-readable storage medium of claim 11, wherein parsing the indication specifying whether the content is cacheable in the CDN comprises:
    in response to determining the indication specifying whether the content is cacheable in the CDN indicates the content corresponding to the data element of the one or more of the plurality of data elements included in the modified data query is cacheable, caching the content corresponding to the data element.

* * * * *